United States Patent
Sun et al.

(10) Patent No.: US 11,487,435 B1
(45) Date of Patent: Nov. 1, 2022

(54) SYSTEM AND METHOD FOR NON-VOLATILE MEMORY-BASED OPTIMIZED, VERSIONED, LOG-STRUCTURED METADATA STORAGE WITH EFFICIENT DATA RETRIEVAL

(71) Applicant: DATADIRECT NETWORK, INC., Chatsworth, CA (US)

(72) Inventors: Zhiwei Sun, Columbia, MD (US); Yuhua Guo, Columbia, MD (US); Jason Micah Cope, Highland, MD (US); Eric Barton, Bristol (GB)

(73) Assignee: DATADIRECT NETWORKS INC., Chatsworth, CA (US)

( * ) Notice: Subject to any disclaimer, the term of this patent is extended or adjusted under 35 U.S.C. 154(b) by 0 days.

(21) Appl. No.: 17/305,171

(22) Filed: Jul. 1, 2021

Related U.S. Application Data

(62) Division of application No. 16/020,266, filed on Jun. 27, 2018, now Pat. No. 11,086,524.

(51) Int. Cl.
*G06F 3/06* (2006.01)
*G06F 12/0804* (2016.01)
*G06F 16/22* (2019.01)

(52) U.S. Cl.
CPC ............ *G06F 3/0611* (2013.01); *G06F 3/068* (2013.01); *G06F 3/0644* (2013.01); *G06F 3/0647* (2013.01); *G06F 3/0659* (2013.01); *G06F 12/0804* (2013.01); *G06F 16/2246* (2019.01); *G06F 2212/1024* (2013.01); *G06F 2212/608* (2013.01)

(58) Field of Classification Search
CPC .. G06F 3/0611; G06F 16/2246; G06F 3/0644; G06F 3/0647; G06F 3/0659; G06F 3/068; G06F 12/0804; G06F 2212/1024; G06F 2212/608
See application file for complete search history.

(56) References Cited

U.S. PATENT DOCUMENTS

| | | | | |
|---|---|---|---|---|
| 10,162,843 | B1 * | 12/2018 | Srivastav | G06F 16/273 |
| 2015/0234669 | A1 * | 8/2015 | Ben-Yehuda | G06F 3/0604 |
| | | | | 718/1 |

* cited by examiner

*Primary Examiner* — Idriss N Alrobaye
*Assistant Examiner* — Richard B Franklin
(74) *Attorney, Agent, or Firm* — Rosenberg, Klein & Lee

(57) ABSTRACT

A system and method for efficiently storing and accessing large volumes of metadata persistent on Non-Volatile Memory (NVM) storage systems is provided. The system applies log-structured, Copy-on-Write (CoW) $B^+$ tree methods, and supports a core-affine data and resource partitioning approaches on the system's architecture and platform with a high-degree of parallelism within the CPU, NVMe storage, and networking devices. The subject system and method efficiently indexes both in-core (DRAM resident) and out-of-core (NVM resident) metadata, supports a variety of data access patterns, supports CoW features and provides verifiable data safety and integrity capabilities. The present system minimizes latencies over all aspects of the metadata management and access path by leveraging core-affine resource partitioning with runtime environment providing lightweight user-level threads with low-latency context switching that execute within the exclusive context of a dedicated CPU core, and partitioned resources.

7 Claims, 7 Drawing Sheets

FIG. 6   Node Evolution and Object Migration over multiple iterations of the CoW Pipeline

SYSTEM AND METHOD FOR NON-VOLATILE MEMORY-BASED OPTIMIZED, VERSIONED, LOG-STRUCTURED METADATA STORAGE WITH EFFICIENT DATA RETRIEVAL

FIELD OF THE INVENTION

The present invention addresses a data management and access system, and particularly, a system configured for efficient metadata storage and retrieval.

More in particular, the present invention is directed to a data storage system capable of efficient storage of data (and/or metadata) and providing efficient access to large volume of data (and/or metadata) persisted on Non-Volatile Memory (NVM) storage over the lifetime of the data storage system.

In overall concept, the subject inventive system uses multi-core processor principles, and supports a core-affine data and resource partitioning approach on the system's architectures and platforms having a high-degree of parallelism within the system's CPU, NVM-based storage, and networking devices.

In addition, the present invention is directed to a data management and access system which supports log-structured persistent metadata storage which uses B+ tree-based methodology and efficiently indexes both in-core metadata (DRAM resident) and out-of-core metadata (NVM resident), which supports a variety of metadata access patterns (such as, for example, point and range queries), and applies Copy-on-Write (CoW) routines to attain ACID (automicity, consistency, isolation, and durability) using transactional updates that safely provide concurrent access to versioned snapshots of the metadata set over numerous epochs.

The present invention is also directed to a system and method using a fine-grained data driven partitioning of the system resources for optimized, versioned, log-structured metadata storage with efficient data retrieval which provides verifiable metadata safety and integrity capabilities.

The present invention is further directed to a system which minimizes latencies over all aspects of the metadata management and access path by leveraging core-affine resource partitioning where the runtime environment provides lightweight user-level threads with low latency context switching that execute within the exclusive context of a dedicated CPU core, NUMA (non-uniform memory access)-aware memory pools, lockless data structures stored in thread-local storage that avoids thread synchronization and access serialization, thus preventing starvation of other threads within the runtime and stalls within the execution pipeline.

BACKGROUND OF THE INVENTION

Metadata terminology refers to "data about data". Specifically, metadata is data information that provides information about other data. Customarily, metadata is defined as the data providing information about one or more aspects of the data, and usually is used to summarize basic information about data.

Metadata may include information on means of creation of the data, purpose of the data, time and date of creation of the data, creator (or author) of the data, location of the data on a computer network where the data was created, standards used for creating data, file size, etc., and thus, metadata can make tracking and working with specific data easier.

Metadata can be stored either internally in the same file (or structure) as the data (this is called embedded metadata), or externally, in a separate file (or field) from the data. Data repository typically stores the metadata detached from the data, but can be designed to support embedded metadata approaches.

Each metadata storage option has advantages and disadvantages:

(a) Internal storage assumes the metadata travel as part of the data it describes. Thus, metadata is always available with the data, and can be manipulated locally. This method creates redundancy (precluding normalization), and does not allow managing all of a system's metadata in one place. It may increase consistency, since the metadata is readily changed whenever the storage is changed.

(b) External storage allows collocating metadata for all the contents, for example, in a database, to permit efficient searching and management. Redundancy can be avoided by normalizing the metadata's organization. In this approach, metadata can be united with the content when information is transferred, for example, in streaming media, or can be referenced (for example, as a web link) from the transferred content.

A problem may occur where the division of the metadata from the data content, especially in stand-alone files that refer to their source metadata elsewhere, increases the opportunities for misalignment between the two, as changes to either may not be reflected in the other.

Metadata can be stored in either human-readable or binary form. Storing metadata in a human-readable format, such as XML, can be useful since users can understand and edit it without specialized tools. However, text-based formats are rarely optimized for storage capacity, communication time, or processing speed. Binary metadata format enables efficiency in all these aspects, but requires special software to convert the binary information into human-readable content.

In metadata-database management, each relational database system has its own mechanism for storing metadata. Examples of relational database metadata may include:
  a) tables of rows in a database, their names, sizes, and numbers of rows in each table;
  b) tables of columns in each database, what tables they are used in, and the type of data stored in each column.

Non-Volatile Memory (NVM) technologies have attracted attention as a memory type suitable for metadata journaling File Systems. Non-volatile memory (NVM) is a storage class memory, which is available in numerous formats, for example, Spin-Transfer Torque Memory (STT-RAM), Phase-Change Memory (PCM), Memristor, and 3D-XPoint, which combine the features of the DRAM-like performance and byte-addressability. NVM can be used either as persistent storage or memory, and is a good candidate to eliminate the I/O bottleneck in current computer systems.

Storage and persistence of metadata using Non-Volatile Memory to optimize metadata storage and access by efficiently exploiting the advantages of Non-Volatile Memory has been widely explored in the data storage community. For example, J. Chen, et al., in "FSMAC: A File System Metadata Accelerator with Non-Volatile Memory", as well as C. Chen, et al., in "Fine-Grained Metadata Journaling on NVM", describe various methods of storage of metadata using Non-Volatile Memory.

Designing methods to store metadata on storage systems that are equipped with Non-Volatile Memory (NVM) devices is a challenge for existing systems due to NVM device properties impacting the traditional metadata access profiles, such as accessing large volumes of small metadata objects in random/independent and batched/clustered data patterns.

The architecture and physical properties of Non-Volatile Memories (NVMs), including Solid State Drives (SSDs) and persistent memories, exhibit characteristics that are challenging for existing metadata storage systems. These properties include:

Asymmetries in read and write access latencies, Input/Output (TO) Operations per Second (IOPS), and streaming data throughput within the same storage device;

Asymmetries in read and write streaming data throughput based on the number of concurrent IO requests the storage device is processing;

Reductions in the lifetime and endurance of storage devices that is proportional to the rate at which data on the device is changed and mutated;

Reductions in the lifetime, endurance, and performance of storage devices when IO sizes are much less than the optimal IO size for the device (e.g. the block length or the erase region length); as well as Stalls in the data access pipeline that occur (1) as a storage device is performing capacity management processes (such as garbage collection and data movement), or (2) when the device is shared and contended for by more than one process.

Metadata objects are often "small" and can be much smaller than the optimal IO size required to optimize the latency, IOPS, and/or streaming throughput IO profiles of these devices. Unfortunately, the asymmetric access of the devices is negatively affected and amplified by metadata workloads.

The internal management processes of the storage devices can make metadata access profiles unpredictable and the cost of these operations can easily eclipse the cost of accessing of a small object under ideal conditions. Safely ensuring shared access to a device from multiple threads adds additional overhead to data access times for small objects (as a result of locking or CPU atomic instructions).

As the latency of Non-Volatile Memories continues to approach and converge upon the latency of the volatile memory (such as DRAM), IO stalls and latency that can be attributed to CPU processing and thread synchronization will add noticeable overhead to the IO pipeline.

Many existing metadata storage methods assume the storage device is the limiting factor and ignore other factors that add additional costs to the IO pipeline (such as thread synchronization).

Methodologies are needed which would support streaming of metadata to the NVM device with an optimized "write" profile. It is also needed that metadata is organized and constrained such that the "read" profile is not severely impacted.

SUMMARY OF THE INVENTION

It is therefore an object of the present invention to provide a Non-Volatile Memory-based data management and access system and method configured for optimized, versioned, and log-structured metadata storage with efficient data retrieval.

It is another object of the present invention to provide a multi-core processor-based data storage system and method using, in combination, (a) a metadata storage approach that is based on the log-structured, Copy-on-Write (CoW) B+ tree techniques, and (b) a core-affine data and resource partitioning on system architectures and platforms with a high-degree of parallelism within the CPU, NVM storage, and networking devices.

An additional object of the present invention is to provide a system capable of supporting log-structured persistent metadata storage that efficiently indexes both in-core (DRAM resident) and out-of core (NVM resident) metadata, and supports a variety of data access patterns (e.g., point and range queries).

It is still an object of the present invention to provide a metadata storage and retrieval system which supports CoW features (e.g., ACID and transactional updates) that safely attain a concurrent access to versioned snapshots of the metadata set over numerous epochs), and provides verifiable data safety and integrity capabilities.

It is a further object of the present invention to provide a metadata storage system which is configured to minimize latencies over all aspects of the metadata management and access path by leveraging core-affine resource partitioning in which the runtime environment uses lightweight user-level threads with low-latency context switching that execute within the exclusive context of a dedicated CPU core, NUMA-aware memory pools, lockless data structures stored in thread-local storage, where "starvation" of threads (due to thread synchronization and access serialization) within the runtime is prevented, and where fine-grained, data driven partitioning of system resources is defined for efficient operation.

In broad aspect, the subject inventive concept addresses a method for metadata management and access in a Data Storage System, which contains:
  a Central Processor Unit (CPU) sub-system,
  a Metadata Management Unit configured in the Data Storage System and operatively coupled to the CPU sub-system,
  a memory pool operatively coupled to the CPU sub-system and the Data Storage System, and
  a storage sub-system configured with a plurality of Non-Volatile Memory (NVM) devices operatively coupled to the Data Storage System, the CPU sub-system and the memory pool.

The components of the present invention can be used to build and instantiate various classes of Data Storage Systems. Examples of the Data Storage System classes include Block Storage Systems, Object Storage Systems, Key-Value Storage Systems, and File Systems. Each type of the Data Storage Systems leverages the Metadata Management Unit of the invention to define, expose, and manage class-specific metadata types, policies, and metadata management methods.

The subject method is carried out through execution of the following routines:
  partitioning the CPU sub-system into a plurality of processor cores (either in a pre-arranged fashion or dynamically during the metadata management and access upon receipt of an I/O request);
  assigning respective portions of the Data Storage System, the memory pool and the NVM-based storage sub-system, respectively, to each of the plurality of processor cores;
  configuring a set of a plurality of operational threads; and
  operatively coupling (pinning) each of the set of plurality of operational threads to a respective one of the plurality of processor cores.

At least one data generating entity is operatively coupled to the CPU sub-system and the Data Storage System. In operation, the data generating entity produces at least one Input/Output (I/O) request which includes a bulk data portion, and a metadata portion containing a plurality of metadata shards. The I/O requests also include a processing core identification field, which contains a mapping information assigning each of the plurality of metadata shards in the metadata portion of the I/O request to a respective one of the plurality of processing cores.

The subject method further continues through the steps of:
operatively coupling each metadata shard to the operational thread pinned to the respective processor core in accordance with the mapping information contained in the processor core identification field of the I/O request for independent processing using the respective portions of the Data Storage System, memory pool and NVM-based storage sub-system exclusively assigned to the respective core; and migrating each metadata shard between the data generating entity and the assigned portion of the NVM-based storage sub-system via the assigned portion of the Data Storage System in accordance with commands of the Metadata Management Unit of the Data Storage System.

In addition, the subject method includes the further steps of:
configuring each of the respective portions of the Data Storage System with an Intent Log structure, a $B^+$ tree metadata update structure operatively coupled to the Intent Log structure, and an object aware cache structure operatively coupled between the $B^+$ tree metadata update structure and the respective portion of the NVM-based storage system.

When the I/O request is a metadata Write request, the subject method supports the steps of:
collecting the plurality of metadata shards arrived with the I/O request in the Intent Log structure attributed to the processor core indicated in the processor core identification field of the I/O request until a predetermined condition is met, subsequently, inserting the plurality of metadata shards collected in the Intent Log into the $B^+$ tree metadata updated structure upon the predetermined condition has been met, and subsequently, persisting each metadata shard in the portion of the NVM-based storage sub-system attributed to the processor core in question.

The predetermined condition may include either a fullness of the Intent Log storage device or a predetermined time period.

The $B^+$ tree metadata update structure is configured with a root node on a first tier which can branch into at least two internal nodes forming a second tier, with each internal node capable of branching in at least two leaf nodes forming a third tier of the $B^+$ tree.

The collection of the plurality of metadata shards is inserted into said $B^+$ tree metadata update structure beginning with the root node followed by the internal nodes and subsequently followed by insertion of metadata shards in the leaf nodes.

The object aware cache (which is operatively coupled to the $B^+$ tree) is configured with dynamically changing information on each metadata shard residence and state.

The subject method further uses the following routines:
applying a Copy-on-Write (CoW) routine to each metadata shard on each update thereof through:
reading each original metadata shard from the assigned portion of the NVM-based storage sub-system into the assigned portion of the memory pool, updating the state of each original metadata shard to identify it as a clone metadata shard,
applying each update to the clone metadata shard,
establishing an identification for the updated clone metadata shard different than the identification of each original metadata shard, and
storing updated clone metadata shard at a second address in the assigned portion of the NVM-based storage sub-system in a non-interfering fashion with a first address of each original metadata shard.

The subject method assumes applying multiple iterations, including a first epoch, a second epoch, and at least a third epoch to the $B^+$ tree metadata update structure, through the steps of:
in the second epoch, subsequent to the first epoch, appending each metadata shard to an Object Log of the root node existing in the first epoch, thus filling the Object Log of the root node, and
in the third epoch, subsequent to the second epoch, cloning the root node existing in the second epoch, and emptying the cloned root node of the second epoch into lower tiers of the $B^+$ tree metadata update structure.

Alternatively, if the I/O request is a metadata Read request, the subject method proceeds through executing the following routines:
searching the assigned portion of the cached Intent Log objects attributed to the assigned processor core,
if the requested metadata is not found in the Intent Log, searching the $B^+$ tree metadata update structure attributed to the assigned processor core for the requested metadata vertically through the root node, the internal nodes, and the leaf nodes in sequential fashion.

This search will prefer to find the tree nodes within the object aware cache. On a miss in the object aware cache, the search may fetch a node from a persistent, NVM-based storage device (such as an SSD, NVMe, or non-volatile memory device). The requested metadata is read from the assigned portion of the NVM-based storage sub-system into the object cache. The searching routine terminates after sending the requested metadata from the object cache to the requesting data generating entity.

These and other objects of the present invention will be apparent when taken in conjunction with the accompanying Patent Drawings and the Description of the Preferred Embodiment(s) of the subject invention.

DETAILED DESCRIPTION OF THE PREFERRED EMBODIMENT(S)

Figure 1:
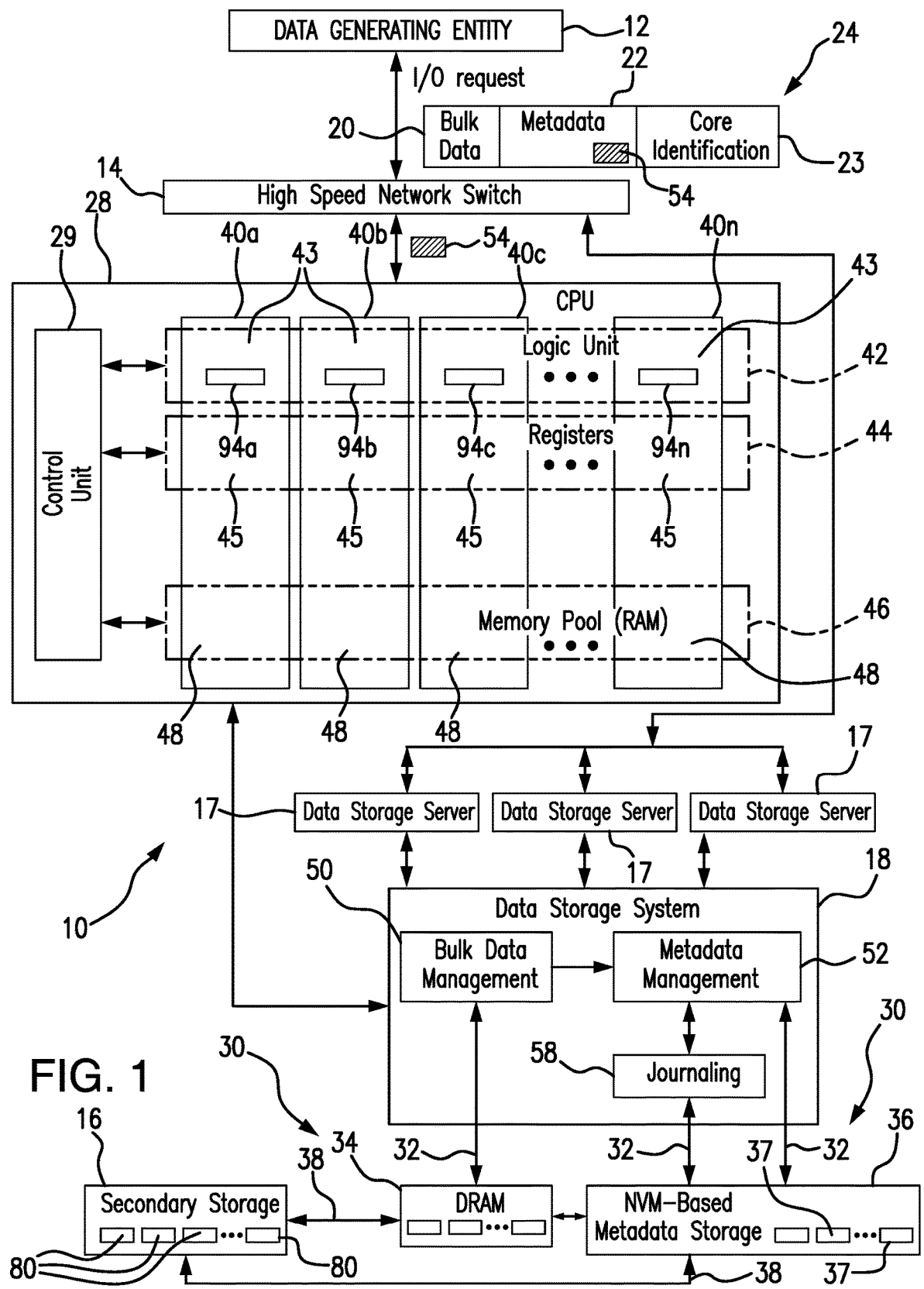
FIG. 1 is a schematic representation of the subject system architecture.

Referring to FIG. 1, the subject system 10 for data/metadata management and access, and specifically, for metadata storage and retrieval, cooperates with a data generating entity 12 (also referred to herein as a user, a client, or a compute node) through a High Speed Network 14. Although a single data generating entity 12 is depicted in FIG. 1, any number of data generating entities 12 may cooperate with the subject data migration system 10.

The data generating entities 12 may be arranged in computing groups, or computer clusters, to perform complex computations of various types. The operation of the compute nodes is dependent on the system application.

The data generating entities 12 may function as servers, supercomputing clusters, etc., and have the capacity to "write" by outputting data (also referred to herein as "bulk" data) and metadata, as well as "read" data and metadata from, the memory or storage. The memory/storage may include the primary (or buffer) memory associated with the Central Processor Unit (CPU), in the form of the RAM memory pool, DRAM, as well as memory and storage structures associated with the Data Storage System 18, and a secondary storage sub-system 16 where the data and metadata are persisted, or from an external memory, as well as any other device. The secondary sub-system 16 may include an array of NVMe devices, Hard Drive Disks (HDDs), or other storage system suitable for data storage and retrieval.

The Data Storage System 18 may include, but not limited to, Block Storage System(s), Object Storage System(s), Key-Value Storage System(s), and File System(s). Each type of these system(s) is configured with the subject Metadata Management Unit 52 which functions to define, expose, and manage class-specific metadata types, policies, and metadata management methodologies, such as, for example, managing where the metadata resides and providing efficient access to that metadata over the lifetime of the data storage system 18.

The data generating entities 12 are connected through the High Speed Network 14 to the Data Storage System 18 which includes a number of Data Storage Servers 17 which manage bulk data and metadata management and access from and to the compute nodes (data generating entities) 12.

The ratio of the compute nodes 12 to the Data Storage Servers 17 in the Data Storage System 18 may be in excess of 1000 in certain applications. The Data Storage Servers 17 in the Data Storage System 18 may satisfy requests of the compute nodes 12 in the same order as the requests are received at the Data Storage Server 17. Alternatively, the Data Storage System 18 may satisfy requests from the data generating entities 12 in any other manner applicable in the subject system 10.

During the "write" Input/Output (I/O) cycle of the compute nodes' operation, the bulk data 20, as well as the metadata 22 (combinably constituting a File 24) may be transferred from the data generating entity's cache to the Data Storage Server(s) 17. Responsive to the request containing the File 24, the Data Storage Server 17 may place data in the Data Storage System 18 or other storage area, including the secondary storage 16, for subsequent retrieval upon receiving the request from the data generating entity 12.

The High Speed Network 14 functions as a high speed switch and may be based on any of the network transport protocols, such as, for example, Infiniband (IB), Fibre Channel (FC), Gigabits Ethernet (GIGE), etc.

The Primary Storage 46 is associated with the CPU 28. The Primary Storage 46 is also referred to herein interchangeably as Primary Memory, Main Storage, Internal Storage, Cache Memory, Buffer Memory, Main Memory, or RAM (Random Access Memory), and may constitute an entire (or a portion of) the memory pool in the system 10. The Primary Memory 46 is the part of the system 10 which holds data/metadata and instructions for data/metadata processing and other routines executed in the subject system 10. The Primary Memory 46 stores program instructions or data/metadata for only as long as the program they pertain to is in operation.

The Primary Memory 46 is closely associated with the CPU 28. Although shown in FIG. 1 as the part of the CPU 28, the Primary Memory 46 may be an entity physically separated therefrom.

The CPU 28 includes a Control Unit 29 which contains circuitry that uses signals to direct the CPU 28 to execute stored program instructions. The Control Unit 29 cooperates with the Arithmetic/Logic Unit (ALU) 42 and the Main Memory 46. The ALU 42 executes all arithmetic and logical operations in the system 10. The CPU 28 further includes Registers 44 which provide temporary storage areas for instructions and/or data/metadata.

The processor (CPU) 28 is operatively connected to the Data Storage System 18. The Data Storage System 18 includes (or cooperates with) a Memory Sub-System 30 which is operatively coupled with the Data Storage System 18 through the Memory Bus 32. The Memory Sub-System 30 includes the NVM-based metadata storage 36. The Memory Sub-System 30 may also include other storages, such as, for example, a Direct Random Access Memory (DRAM) 34 which is operatively interconnected with the NVM-based metadata storage 36. The Memory Sub-System 30 is connected to the Secondary Storage sub-system 16 via the I/O bus 38.

The architecture shown in FIG. 1 is an exemplary embodiment only, and other alternative implementations of the subject system are equally applicable to the present inventive concept. For example, the secondary storage 16 may be combined with, or substituted by, the NVM-based memory sub-system 30, so that the NVM-based memory sub-system 30 may be considered a secondary storage operatively connected directly to the Data Storage System 18. In this case scenario, the secondary storage 16 includes NVMe devices 80 (for persistent storage of the metadata) which are directly coupled to the object cache 70 instead of, or in addition to, the NVMe devices 37.

The CPU 28 in the subject system 10 constitutes a multi-core processor system which, as will be detailed in further paragraphs, is configured with a plurality of independent processing units (referred to herein as cores) 40 (depicted in FIG. 1 as cores 40a, 40b, 40c, 40d, . . . , 40n) each of which reads and executes program instructions independently each from the other.

Although operating strictly independently one from another, the cores 40 may be physically interconnected via topologies which include bus, ring, two-dimensional mesh, crossbar, etc. The cores 40 in the present system may constitute homogeneous cores which include identical cores. Alternatively, a heterogeneous multi-core system may be used where cores 40 are not identical.

The cores 40a, ..., 40n in the subject system 10 may be integrated into a single circuit die (such as chip multi-processor, or CMP), or can reside on multiple dies in a single chip package.

Each core 40 runs a respective thread 94 which is specifically assigned to such core. Specifically, each core 40a, ..., 40n is assigned (or pre-allocated) for execution of a specific thread. A thread 94 (94a, 94b, 94c, ..., 94n), also referred to herein as a thread of execution, is a small sequence of programmed instructions that can be managed independently by a scheduler, and is typically a part of the operating system. Generally speaking, the thread 94 is a component of a process.

In conventional systems, multiple threads can exist within one process, executing concurrently and sharing resources such as memory, logic, etc. In the present system, however, the threads 94a, ..., 94n which are pinned to different CPU cores 40a, ..., 40n do not share resources, but operate completely independent of the threads executed on different cores. Each thread uses its own resources pre-allocated (or attributed) to its respective core.

The multi-core processor system 28 can run multiple threads on separate cores 40a, ... 40n at the same time in a highly parallel fashion, thus increasing overall speed for programs amenable to parallel computing.

Returning to FIG. 1, the CPU sub-system 28 (also referred to herein as a multi-core processor system) operates using the system Logic Unit 42, Registers 44, and the Memory (RAM memory pool) 46, which constitutes the CPU resources. The CPU's resources are distributed among the multiple cores 40a, ..., 40n, so that each core 40a, ... 40n can operate in an independent non-sharing fashion using exclusively a portion of the CPU's resources attributed thereto. The cores 40a, ..., 40n do not share the Primary Memory 46 between them. Instead, the Primary Memory 46 is divided into Memory Portions 48, and each core 40a, ..., 40n uses exclusively a respective Primary Memory portion 48. Each Memory Portion 48 of the Primary Memory 46 is attributed to the respective independent core 40.

Similar to the portioning of the Primary memory 46, a portion 43 of the logic unit 42, as well as a register portion 45 of the register 44 is attributed to a respective core 40 and operates independent of operation of other cores 40 by using exclusively portions of CPU's resources in a non-sharing manner.

In the subject architecture 10, the cores 40 may implement messages passing or share-memory inter-core communication through interconnect topologies. However, for the purpose of the metadata storage and retrieval in accordance with the principles of the present invention, the threads running on different cores 40a, ..., 40n are independent with respect to threads running on other cores.

As depicted in FIG. 1, the Data Storage System 18 provides a Memory Management/Storage/Retrieval Channel (also referred to herein as a Metadata Management Unit) 52 for the metadata storage and retrieval. In addition, the Data Storage System 18 provides a Bulk data Management channel (Bulk Data Management Unit) 50 for addressing Bulk Data storage/retrieval operations in the subject system.

Although being capable of migrating/storing/retrieving both bulk data and metadata, the subject system 10 will be further described as a system which focuses on the organization of the metadata management and access relative to the storage that includes NVM-based devices and uses the subject methodologies to optimize the metadata access profiles.

The present invention mainly addresses the storage and retrieval of the metadata, and thus (although being capable of routing the bulk data 20 through the data management channel 50 for storing bulk data), the subject system will be further described with emphasis on addressing the metadata management storage and retrieval through the Metadata Management Channel 52.

Figure 2:
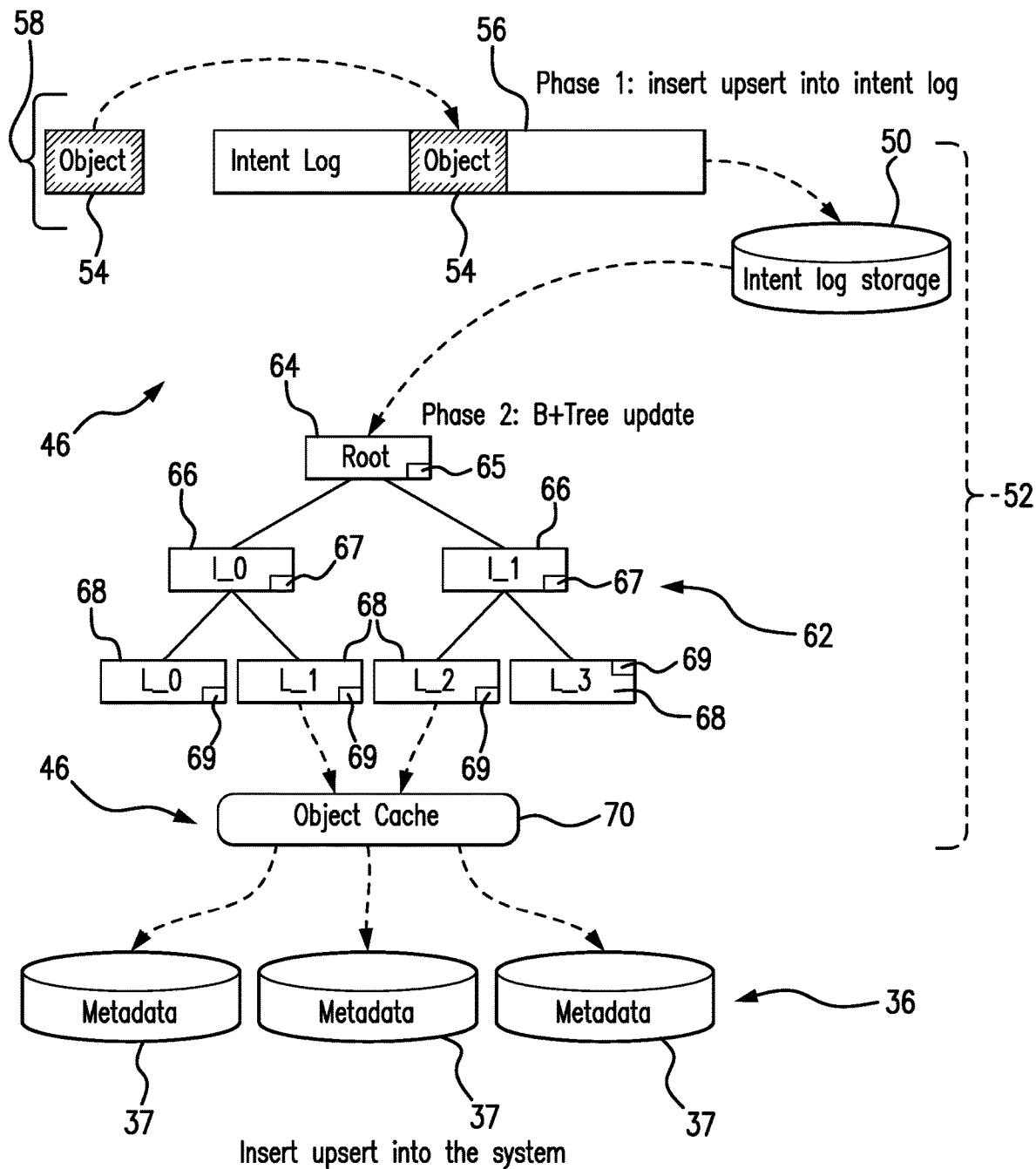
FIG. 2 depicts schematically a migration path of the metadata during execution of a "write" I/O request in the subject system.

The data generating entities 12 are configured to issue at least one I/O request for writing or reading data/metadata, which is processed by the subject system 10. Referring to FIGS. 1 and 2, in operation, upon at least one data generating entity 12 issues an I/O request to "write" the data/metadata, the "write" request is passed from the data generating entity 12 to the subject system 10 via the High Speed Network 14 in the form of the File 24. The File 24 may include the Bulk Data field 20 and the Metadata field 22 which are embedded into the I/O request combinably in the single File 24 for migrating through the system 10 and for storage in the NVM-based metadata storage 36, or the secondary storage sub-system 16.

In addition, the I/O request includes a core identification field 23 which is embedded in the File 24. Upon receipt of the I/O request, the system 10 analyzes the core ID field 23 of the File 24 to make a decision to which core 40a, 40b, 40c, ..., or 40n each metadata shard is to be mapped.

Thus, upon receipt of a given I/O request, it is mapped to a specific thread 94 pinned to the core 40 indicated in the core ID field 23, for example, thread 94a. This thread will run the process shown in FIG. 2 (including writing the metadata into the Intent Log, applying changes on the $B^+$ Tree, and persisting the object into an NVMe device 37 in the NVM-based metadata storage 36). For the thread 94a runtime, there is no interruption by, or competition with, other threads.

Referring to FIG. 2, the metadata 22 is initially stored into the portion of the Intent Log 56 (attributed to the core 40 in question). Subsequently, the metadata is written into the portion of the $B^+$ Tree attributed to the core 40 in question. Subsequently, the metadata 22 is persisted into NVMe devices 37 of the NVM-based metadata storage 36 which are attributed to the core 40 in question. Bulk data 20 may migrate into the DRAM 34, or be stored in the NVMe devices 37 of the NVMe-based metadata storage 36 as well (but in different section of the devices 37, such as in different namespace or reserved blocks).

The system metadata is subsequently generated to track the address info of bulk data (such as the device id and block id), so that bulk data can be found on "reads" (read I/O requests).

Referring to FIGS. 1 and 2, the metadata 22 in the I/O request file 24 may include one or more shards 54. Each metadata shard 54 has a predetermined size (for example, 32 Kib-128 Kib) which is predetermined as an optimal metadata block size for the purposes of efficient migration through the system 10.

Specifically, the metadata field 22 is organized and indexed into multiple metadata structures (objects) 54 optimized for multiple access patterns. As depicted in FIG. 1, journalling system 58 is built-in into the Data Storage System 18 in the metadata data management system to support metadata consistency and recoverability. Recording of the changes (updates) to metadata to a "journal" 58 before in-place updating facilitates the metadata restoration from failures without corrupting the data. The Intent log 56 is used as the journal mechanism 58 in the present system. The Intent Log 56 may reside on the DRAM 34.

As shown in FIG. 2, the streaming metadata, such as new metadata (also referred to herein as original metadata) or metadata updates on the original metadata are temporary persisted in a circular buffer (also referred to herein as the Intent Log) 56 with a bounded capacity. Streams of metadata are received and written into the Intent Log 56 directly.

Updates (objects) 54 are entered into the Intent Log 56 are to batch up a collection of metadata objects 54 for a single I/O request.

While the subject system attempts to optimize these I/Os so that they use block sizes that are optimal for the device (usually a multiple of the SSD erase region size, for example, 32 KiB-128 KiB), there are cases where it is needed to eagerly flush metadata to an NVMe 37 (e.g., a flush/transaction timeout, high-priority metadata that must be flushed immediately). To accommodate execution of the immediate flushing, the block sizes for the Intent Log 56 are made adaptive.

The Intent Log 56 is equipped with the Intent Log storage 60 having a predetermined capacity. When the Intent Log storage 60 capacity diminishes, or upon a predetermined time interval expiration, the metadata objects 54 stored in the Intent Log 56 must be permanently persisted into another data structure. In the subject system, such additional data structure is configured as a log-structured $B^+$ tree-like persistent data structure 62 that is optimized for the NVM-based storage and metadata corruption scenarios.

The $B^+$ tree-like structure 62 in the subject system 10 is configured as a collection of logs (also referred to herein as nodes) that are organized vertically based on age (e.g. update order into the $B^+$ tree) and partitioned horizontally by a metadata sort order (e.g. lexically ordered in ascending order from left to right). The nodes in the B+ tree-like persistent data structure 62 include a root node 64, a number of internal nodes 66 (for example, I_O and I_1), and leaf nodes 68 (for example, L_O, L_1, L_2, and L_3).

For the $B^+$ Tree 62, the node sizes are fixed and are optimized to attain a balance of (1) sufficient streaming "write" performance, and (2) minimize read I/O latencies. The nodes sizes may be at least 32 KiB and can be as large as up to (or beyond) 128 KiB.

The "optimal" node size is Solid State Drive (SSD)/NVMe device dependent, and can adapt to the device constraints. All of the metadata blocks are aligned with the size of NVMe device block and are at least the size of the minimum atomic I/O unit for that device so that no read-modify-writes are incurred on the storage device 37.

The NVM memory 36 allows the metadata storage system 10 to accumulate and buffer sufficient updates (metadata updates) 54 to maximize the benefit of re-indexing the metadata objects 54 stored within the Intent Log 56 into additional data structures.

The Intent Log 56 is a portion of the Data Storage System, and specifically is a portion of the Metadata Management Unit 52. The Intent Log 56 also serves as a Journal for recovering metadata that was not yet applied to additional data structures during failures, as will be detailed in further paragraphs.

The $B^+$ tree 62 is an N-ary tree with a variable large number of "children" per node. The root node 64 may be either a leaf node or a node with two or more children. The $B^+$ tree 62 can be viewed as a B tree in which each node contains only keys (unlike the key-value pairs), and to which an additional level is added at the bottom with link leaves.

The primary value of the $B^+$ tree 62 is in storing data for efficient retrieval in a block-oriented storage context, in particular, file systems. This is primarily because aligned binary search trees ($B^+$ trees) have very high fan out (number of pointers to child nodes in a node, typically on the order of 100 or more), which reduces the number of I/O operations required to find an element in the tree. The subject system 10 uses $B^+$ Tree invariants to achieve balance within the tree structure to help achieve predictable I/O latencies for any element in the tree. In the subject system 10, the tree 62 uses Copy-on-Write techniques to limit, prevent, and detect data corruption within the tree, as will be detailed in further paragraphs.

The present system further includes data structure aware caches (Object Cache) 70 stored in a volatile memory (for example, DRAM 34). The object cache 70 is used to cache the objects of the $B^+$ Tree 62 for accelerating finding objects that are in RAM 46. It is a read only (no dirty objects) memory.

The sizes of the Intent log storage and Object aware cache preferably do not have fixed sizes. Instead, they are configured with configuration parameters which depend on the system's software and hardware, and are adjusted to sizes of the system. In certain systems, the RAM and storage may be large, while other systems have smaller memory and storage. The sizes of the Intent log storage and Object aware cache thus are adapted for each particular system.

There are three conditions implemented in the subject system for flushing the Intent Log:
 (1) Flushing when the Intent Log is full;
 (2) Flushing at predetermined time intervals (timeout), no matter whether the Intent Log is full or not. The timeout value may be specified, for example, as 300 microsecond; and
 (3) "Eager flushing" implemented for high priority transactions, i.e., request may be generated to flush without waiting, for example, for latency minimization.

"Writes" (write I/O requests) do not migrate into the object cache 70, but after an object 54 is written into a NVMe, the "write" can be indexed in the object cache 70.

On "reads" (read I/O requests), the system 10 searches the object cache 70 first. If no metadata is found in the object cache 70, then it is read from the NVMe device 37.

Specifically, the search prefers to find the tree nodes within the object aware cache. On a miss in the object aware cache, the search may fetch a node from a persistent, NVM-based storage device (such as an SSD, NVMe, or non-volatile memory device).

The object cache 70 facilitates reducing the cost of finding random elements within the data structures such as the Primary Storage 46, NVM-based metadata storage 36, $B^+$ tree 62, circular buffer (Intent Log) 56, Intent Log storage 60, as well as the secondary storage 16, finding clusters of related elements within the data structures in the system 10, and in reducing the metadata management and access and re-indexing costs when elements (objects) are moved from the temporary data structures and into the permanent data structures 36 and/or 16.

The metadata structures (objects) 54 are embedded into the NVM-based metadata memory sub-system 36, that includes one or more Non-Volatile Memory Devices 37, which may be the NVMe devices. The memory sub-systems 36 may be a local storage system with no distributed network connectivity, or include independent storage systems with distributed network connectivity, or clustered/federated storage systems with network shared network connectivity.

The metadata structures (objects, updates, original metadata) 54 can be instantiated multiple times within the memory sub-system 30 to enable:

(a) Sharding and distributing of a single large metadata set, for example, metadata field 22, into a number of smaller sets (objects, shards) 54 across multiple storage devices NVMe 37 to achieve horizontal scalability across storage devices within a respective Data Storage Server 17 and across the set of all storage devices in a cluster of storage systems (as will be presented in further paragraphs); and (b) Achieving data redundancy by replicating a single metadata set 22 across multiple storage (NVMe) devices 37.

Processing within the subject system 10 is optimized to reduce the end-to-end latency of data accesses which is achieved by:

(a) Expressing IO operations as user-level threads that perform lightweight, low-latency context switching. These user-level threads are executed, managed, and scheduled by processing threads (e.g., a Linux pthread or other operating system threads). The processing threads are bound to and have exclusive access to a respective core 40 (40a, 40b, . . . , or 40n) of the CPU 28;

(b) Processing threads have exclusive access to hardware devices (NVMe devices 37, InfiniBand devices associated with the High Speed Network Switch 14, memory pool 48 of the multi-processor CPU 28), and/or hardware device communication data structures (e.g., NVMe device queue pairs, InfiniBand device queue pairs, etc.); as well as (c) Metadata store instances are bounded to and sharded on a specific processing thread 94a, 94b, . . . , or 94n within the storage system. The accessibility scope of all internal data structures and components of the metadata store are also limited to the specific processing thread. The exclusive non-sharing access to the resources of a specific core 40 reduces the costs of arbitrating access to shared resources at the software and data organization levels.

Referring again to FIG. 2 (which depicts an exemplary diagram of the data flow within the subject system 10 shown in FIG. 1), the metadata flow containing objects (such as original metadata or updates to original metadata, also referred to herein as shards, or objects) 54 passes sequentially through the portions of the Intent Log 56, Log-structured B$^+$ Tree structure 62 with a large branching factor, the intelligent Object Cache 70, and related NVMe storage devices 37 attributed exclusively to the core 40 indicated in the I/O request.

The Intent Log 56 of the present system 10 is used to cache the incoming metadata and updates (objects) 54 and subsequently persist them into the storage devices 62 and the NVMe devices 37 (using a double buffering scheme) when the predetermined condition has been met, which may be either the fullness of the Intent Log buffer (storage) 60, or at predetermined time intervals, as well as the "eager flush" condition.

As the Intent Log 56 fills and updates objects (original and/or updates) 54 accumulated in it, numerous changes may be applied and committed to the B$^+$ Tree structure 62 in bulk to reduce the "write" amplification costs and overhead due to CoW B$^+$ techniques. This is a "lazy commit" strategy for persisting the Intent Log resident metadata into the NVMe storage devices 37. By "batching up" the object updates 54, the number of I/Os is reduced, and each I/O is streamed across multiple blocks of the storage device, which is beneficial for maximizing the streaming throughput performance of NVMe storage devices 37.

The B$^+$ Tree nodes include two parts:

1. A metadata section that stores pointers to tree nodes, metadata to track the contents of descendant tree nodes, and metadata to help validate the integrity of the tree (an embedded Merkle Tree), and 2. A hash-chained append-only log of metadata objects. This log serves as a temporary buffer for objects inserted into the tree that have not yet been persisted into a leaf node object.

Unlike traditional B$^+$ Tree structures, in the subject system 10, metadata objects 54 are inserted into the root node 64, specifically, into the log section 65 of the root node 64. When the root node 64 is full, it will trigger and propagate changes to other nodes (internal nodes) 66 resident in the lower tiers of the B$^+$ tree 62 by splitting the log section 65 (of the root node 64) into a number of new log sections based on the child node pivots in the B$^+$ Tree 62.

These new log sections are flushed/appended to the hash chained logs of the children nodes (log sections 67 in the internal nodes 66 and subsequently to log sections 69 of the leaf nodes 68) of the split node.

Conceptually, this insertion and object balancing process is similar to Log-Structured Merge Trees (LSMTs). Divergence from typical LSMT behavior occurs in the subject system 10 when a full (fully filled) leaf node 68 is encountered and require the invocation of B$^+$ Tree invariants. During these situations, the data structure will split the full leaf node (and, recursively, any parent nodes) using normal B$^+$ Tree rules. As a result of these behaviors, object updates gradually propagate down through the vertical levels of the tree 62.

Figure 6:
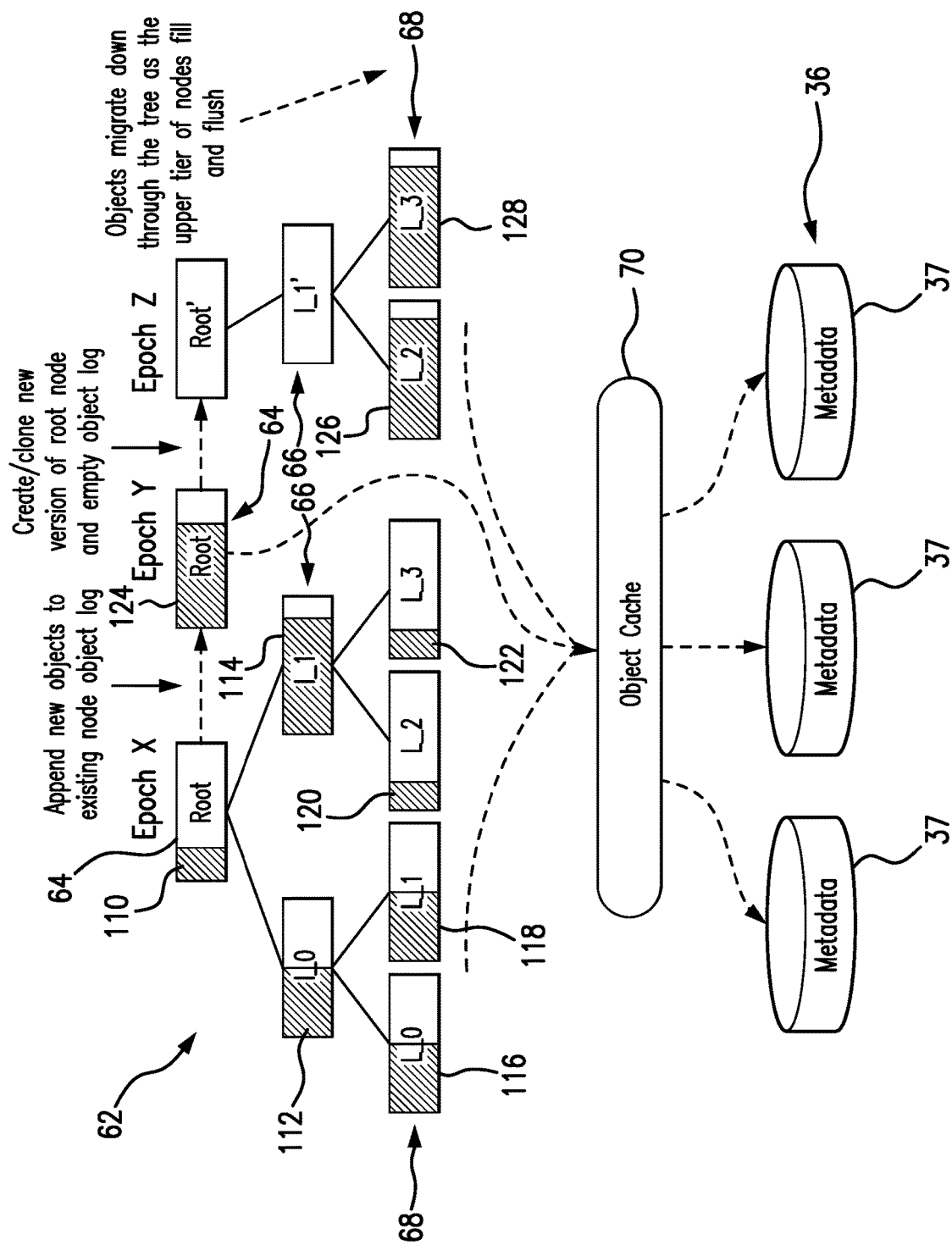
FIG. 6 is a schematic representation of the node evolution and metadata updates migration over multiple iterations of the CoW pipeline.

The data flow presented in FIG. 2 is advantageous for storage on NVMe devices 37 for the following reasons:

(a) The update pattern to both data structures 56, 62 creates large, streaming "writes" that are the optimal way to persist data on NVMe storage devices 37;

(b) The CoW "allocating write" pattern and CoW-aware garbage collectors ensure that updates are applied to free areas of the device 37 that will not incur stalls due to NVM device capacity management processes. The impact of this behavior is illustrated in FIG. 6 (described in the following paragraphs), where new nodes are cloned in the data store (indicated by prime node IDs); as well as (c) The CoW-aware, hash-chained log reduces "write" amplification by safely appending updates to the nodes without forcing a re-write/clone of existing nodes. The impact of this behavior is illustrated in FIG. 6, where the logs grow but nodes are not explicitly cloned unless flushing is required.

Figure 3:
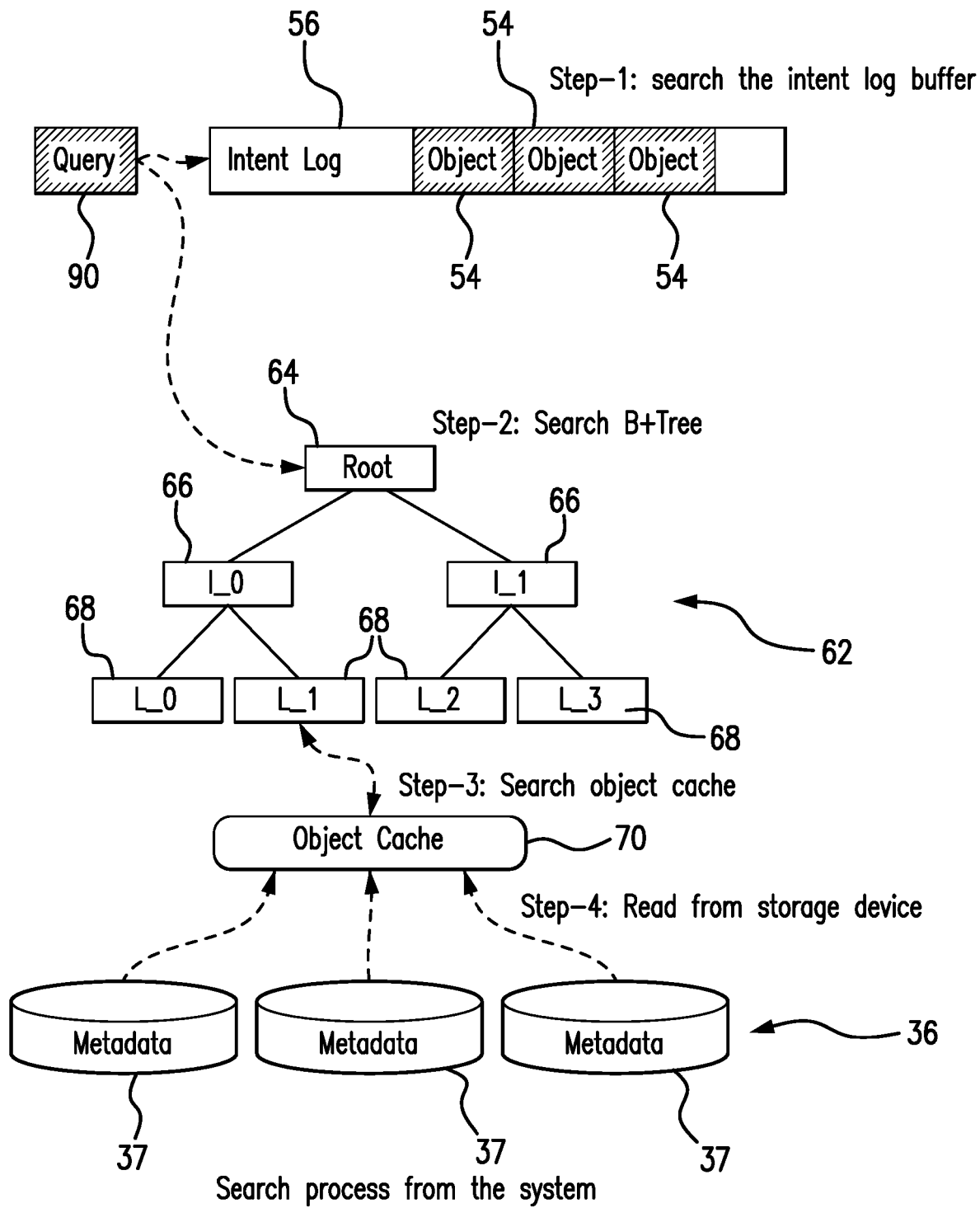
FIG. 3 is a schematic representation of the search process for a requested metadata executed in the present system responsive to a "read" I/O request.

As shown in FIG. 3, which illustrates the exemplary process for performing queries on the data store in the case of the "read" I/O request, when the "read" I/O request is issued by the data generating entity 12, the query (i.e., the read request) 90 (which is the command to search and read a specific metadata identified in the I/O request) searches through all levels of the system where metadata (or portions thereof) may be persisted and reside, including the intent log 56 (intent log buffer 60), the B$^+$ tree persistent metadata structure 62, object cache, and the NVM-based storage 36. Initially, the query program 90 searches the Intent Log Buffer 60 for the metadata object 54 in question (Step 1, "Search the Intent Log Buffer").

The query 90 is also applied to the B$^+$ tree persistent data structure 62, so that the search process is executed in the subject system 10 in Step 2 (Search B$^+$ tree).

In Step 2, the execution of the search routine related to the B+ tree persistent data structure 62 starts from the root node 64 (involving specifically the log section 65 residing therein) and progresses vertically through the internal nodes 66 and the leaf nodes 68, as necessary.

The search process can also be executed in the direction from the leaf nodes 68 to the root node 64.

If Step 1 and Step 2 (searching in the intent log buffer 60 and the B+ tree persistent data structure 62) has not resulted in finding the entire requested metadata object, i.e., no requested object (metadata), or a portion thereof, is found in the Log Buffer 60 or B+ tree 62, the process follows to Step 3 (Search Object Cache) for search of the information related to the requested metadata object 54 in the object cache 70. The object cache 70 may contain the requested metadata file (or portion thereof) or has information on the NVMe device 37 where it is contained. The object cache 70, in Step 4, reads the requested metadata (or the portions thereof) from the NVM-based storage 36, particularly, from the respective NVMe device 37.

When the entire requested metadata file including the number of objects is collected (preferably in the object cache 70), it is sent to the requesting data generating entity 12.

The "read" access pattern is similar to a typical CoW B+ Tree search, where the B+ Tree pivots are used to guide the search to the correct leaf node 68 where the desired element (object) 54 of the metadata structure may reside.

However, the metadata element 54 can also be located in any of the nodes visited along the path. Therefore, metadata object search must inquire each node along the path 64, 66, or 68 to identify if the desired value is resident in one of the internal nodes 66 or leaf nodes 68, and verify that the most recent version of the object 54 is identified.

When considering CoW versioning of the B+ tree, this scheme guarantees correctness by limiting the scope of the hash-chained logs to the version/epoch of the tree 62 being inquired.

Large trees cannot completely reside in DRAM 34 and must be persisted on stable storage, such as NVMe devices 37. Caches are necessary to keep frequently accessed sections of the tree in DRAM. These caches are essential for optimizing "read" and "write" access due to the fact that:

Caches help reduce "write" amplification and help accelerate the CoW pipeline and Merkle Tree computations; and Caches help reduce the costs retrieving out-of-core metadata objects by keeping the interior nodes of the tree resident in cache.

Figure 4:
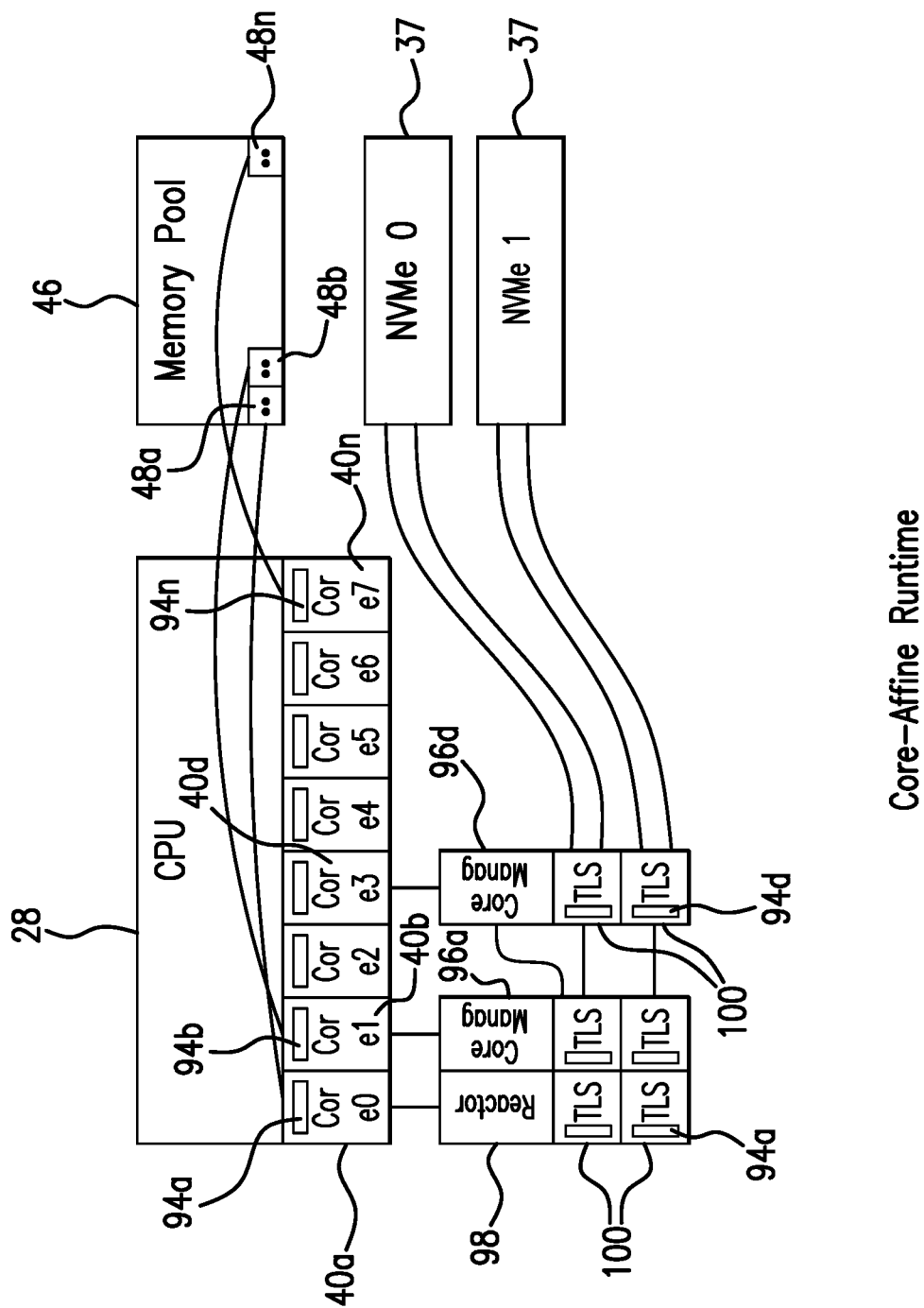
FIG. 4 is a schematic representation of the subject core-affine runtime approach used in the subject system.

FIG. 4 details the components of the subject core-affine runtime concept. A number of user-level threads 94 (94a, 94b, ..., 94n) are created and pinned to separate CPU cores 40 (40a, 40b, ..., 40n), respectively, so that they do not compete against each other. The subject system 10 provides a new concept of the data-driven partition, which is defined based on resources that a user-level thread needs for processing any type of request independently without locking or waiting.

In each partition core 40 of the subject system 10, there is only one respective user-level thread 94, which exclusively uses all resources of the given partition 40, including NUMA-aware memory pool, RDMA buffers, queue pairs and channels to storage resources that are allocated to the given partition 40. Each thread 94a, ..., 94n is dedicated to a given partition 40a, ..., 40n and switches among various tasks with minimal runtime latency by avoiding locks or atomic instructions.

Generally, this approach avoids any locking or waiting, and thereby minimizes runtime latency. A user-level thread is responsible to process all types of tasks, such as updating B+ Tree, executing I/O, and responding to user requests.

As detailed in FIG. 4, the subject system includes the multi-core central processing unit (CPU) 28 which operates based on the subject core-affine concept. Specifically, the CPU 28 includes a number of cores 40 (shown in FIG. 4 as Core 0, Core 1, Core 2, etc.).

The number of CPU cores 40a, 40b, ..., 40n may range from, for example, 8 to hundreds of cores in the subject system. The cores 40 in the present system may be positioned either on the single die or a multiplicity of interconnected dies. However, each core operates independently of other cores.

The present system, by locating a dedicated core with dedicated resources (such as register file, portion of the memory pool, as well as dedicated NVMe device) for each thread, overcomes the drawbacks of standard multi-threading operations where threads share the resources. Such drawbacks as the synchronization (where threads share the same address space, and where a programmer must be careful to avoid race conditions and other non-intuitive achievers) are avoided in the subject system.

In order for data to be correctly manipulated, threads often need to rendezvous in time in order to process the data in the correct order. Threads require mutually exclusive operations in order to prevent common data from being simultaneously modified or read while in the process of being modified. Careless use of such primitives can lead to deadlocks, livelocks, or races over resources. Synchronization needs of standard CPU systems where threads share the resources is completely prevented in the present system.

The present system also overcomes the thread crashes of a process which is an illegal operation performed by a thread when a thread crashes the entire process, where one misbehaving thread can disrupt the processing of all the other threads in the application.

In the present arrangement, each core 40 pre-allocated for execution on a respective thread 94, is built with a core manager sub-system 96 (96a, ..., 96d, ...) operatively coupled to the respective core (40a, ..., 40d, ...).

Cores also require a reactor 98 for the task execution by the thread 94. Reactor 98 is a dedicated thread that is responsible for system initialization, management, monitoring, and event handle tasks. For instance, reactor 98 initializes the NVMe devices 37 (i.e., detect the NVMe devices and set up queue pairs) and launches co-routine threads after system bootup. The reactor 98 uses a scheduler as a contract for the needed task execution. The schedulers are usually used to jump thread execution on producing flows or receiving flows.

Each core 40 also has a number of TLS (Thread Local Storage) protocol units 100. The TLS unit is a computer program that uses static or Global Memory local to the thread to store the thread-specific data.

As shown in FIG. 4, each core 40a, 40b, ..., 40n has a specific connection (operative connection) to a dedicated memory block 48a, 48b, ..., 48n in the memory pool 46. Each core manager sub-system 96a, ... 96d, ... (of a respective core 40a, ..., 40d, ...) also is operatively connected to a respective NVMe device 37 (NVMe 0, NVMe 1, ...) through a respective TLS unit 100. In this manner, each core 40 has its own dedicated resources which do not interfere with resources of other cores 40 in the CPU 28 for execution of a respective thread 94 pre-allocated in each core 40.

In conventional systems, a thread is created and/or scheduled for certain operations, such as Remote Procedure Call (RPC) or an event, etc., and are bound to specified tasks or scheduling queues (for state machines), for the process specified tasks. In the subject system, however, threads have limited functionality and resources, i.e., each thread has its own resources which are not shared with other threads, and each thread is responsible for processing a request through whole stacks, including network, hidden memory data structure, and I/O.

Thread pools are commonly used in conventional systems for quickly scheduling threads to work on various tasks. In the subject system, uniquely, a thread pool is not used. Instead, a set of threads are created and "pinned" to respective cores 40 on a boot up, and these threads are ready for processing the incoming I/O requests independently without interference with other threads allocated for other cores 40.

In most multi-thread systems, threads need to synchronize or compete resources including network resources, storage resources, etc., which incurs lock and resource contentions, and increases processing and IO latencies. In the subject system, each thread is fully pre-allocated with resources for the thread surface, during run time. During run time, a thread does not compete with any other threads, thus avoiding locking or blocking calls. Therefore, the subject system's operation increases the throughput and parallelism in metadata processing storage and reading.

In the subject system, co-routines (also known as user-level threads) are used to enable a thread to process and switch among multiple requests concurrently within the execution context of a single operating system thread. Co-routines are queued in different queues, such as pending queue, ready queue, and finished queue. Each thread will process a co-routine until it is finished, or the running condition is met (i.e., a yield or sleep call is issued to cause a thread to move the current co-routine to pending queue and switch other co-routine from ready queue).

A co-routine thread is concurrently processed with as many requests from a single thread. In the subject system, a parallelism is achieved by executing many of the co-routine processing threads, but reduce interference by disallowing communication or coordination among the co-routine processing threads. To reduce interference, co-routine threads directly manage resources, including NVMe devices 37, their communication and points that are only accessible from the current co-routine processing thread.

As shown in FIG. 4, threads 94 are dedicated and pinned on different CPU cores 40. There is ideally no (or very limited) communication between the threads so that interference among the CPU cores in the subject system is reduced, or entirely prevented. Furthermore, each thread has its own independent access to various resources for performing services. For instance, each thread has its own B+ tree-like data structure 62 for storing metadata, the independent access to memory pool 46, to NVMe devices 37 and network communication point (for example, High speed Network Switch 14). Through this arrangement, the subject system avoids locking or thread synchronization for achieving improved metadata performance.

Figure 5:
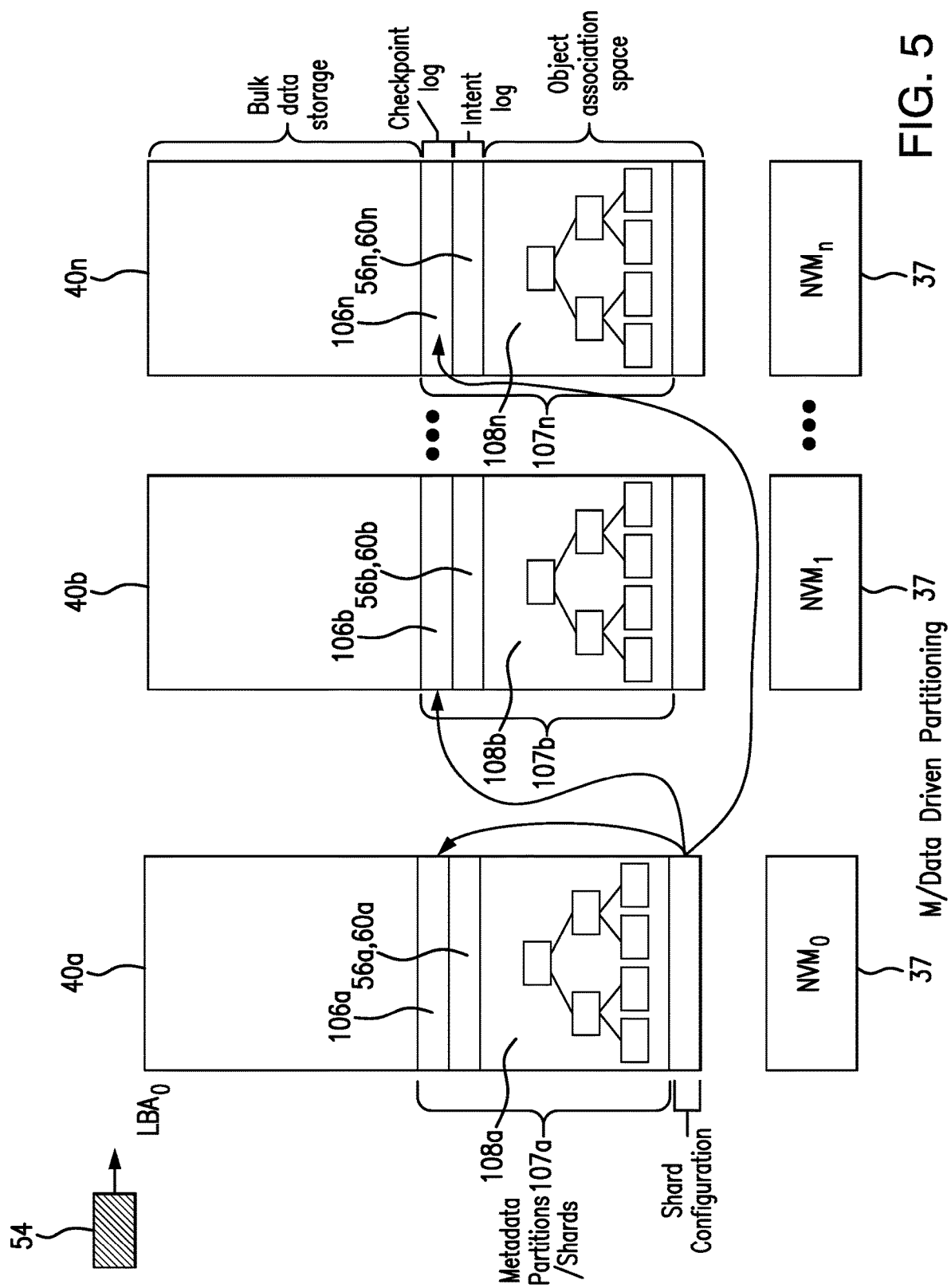
FIG. 5 illustrates schematically the principles of the metadata driven partitioning used in the subject system.

FIG. 5 illustrates the protocol of the subject data driven sharding and partitioning realized within the subject system 10. A metadata (new metadata or updates to an original metadata 54) is routed to the correct partition 40a, 40b, . . . , 40n through multiple phases. Specifically, it is initially routed to a storage system host that operates with multiple storage devices. Subsequently, it is routed to a specific pre-allocated core 40a, 40b, . . . , 40n within the host that has exclusive access to hardware and software resources. Finally, it is routed to a specific resource partition 107a, 107b, . . . , 107n, which is attributed to and managed by a respective core.

This distinct segmentation of metadata sets makes these partitions 107a, 107b, . . . , 107n to function as the storage management unit for the data storage system 10. In this fashion, the whole of the data store can achieve elasticity by balancing these partitions within a single storage system or across multiple, distributed storage systems as the need arises to grow or contract metadata storage capacity. Furthermore, the subject partition concept enables simple recovery processes where entire partitions are recovered at specific CoW snapshots/versions instead of individual keys.

For any change on persisted metadata (metadata block, or object, stored on NVMe device 37), CoW operation (no overwriting) is performed. The CoWed metadata block is stored on a disk 80 immediately once updates have been applied. If it is cached in the RAM 46, it will be indexed in the object cache 70, which is the read only cache.

The CoW routine is executed by:
(a) the B+ tree is searched to find related object/metadata block;
(b) the original object is cloned, and changes are applied on the copied object (CoW);
(c) the CoWed object is written into disk 80, and the B+ Tree node is updated to point to the new location.

By using the core-affine runtime and partitioning concepts in conjunction with the log-structured CoW data store, the subject system can achieve a low latency, high-performance metadata storage system with a high-degree of error detection and recoverability. In the present system, NUMA-aware mempools (memory pools) are created, and on each memory allocation, a buffer is allocated from the same socket of the given core ID. Both DMA and RDMA buffers are allocated based on core-affinity.

Furthermore, each partition has access to all available storage devices. This connectivity enables multiple device partitioning and sharing schemes. One scheme is to share a device among multiple threads and allocated a dedicated communication path (e.g., a submission-completion queue pair) that is exclusively accessed between each thread and the device. For using NVMe devices, each thread creates thread-local queue pairs to all devices that belong to the given partition, so that the thread can submit I/O requests to any storage device without locking or blocking calls. Since each thread has a limited event process rate, the overall system performance is achieved by concurrently running multiple partitions. All of handles, or access of resources, of a given partition are stored in the thread-local storage (TLS) 100 of the specified user-level thread.

Alternatively, each device could be assigned to a specific thread, such that, for example, a single thread has exclusive access to the entire device and not just the dedicated communication path (queue pair). This scheme further reduces contention, because a thread has exclusive access to a device and multiple threads will content with each other through indirect accesses to the device (e.g., contention within the storage device controller).

The concept of data driven positioning depicted in FIG. 5 supports the operation of the present system. Each CPU core 40 (40a, 40b, . . . , 40n) processes data (bulk data and metadata) partitioned between the cores. During the I/O execution, bulk data/metadata are mixed with the metadata embedded into the I/O request along with the bulk data. The bulk data and metadata are partitioned into separate shards 54, each of which is processed by a separate core 40a, 40b, . . . , 40n.

As shown in FIG. 5, each core 40a, 40b, . . . , 40n processes correlated bulk data shards and metadata shards, and is coupled (and uses) a specific NVMe device 37. For example, the core 40a uses the NVMe 0 device 37, the core 40b uses the NVMe 1 device 37, while the core 40n uses the NVMe n device 37.

Each core 40a, 40b, . . . , 40n has a checkpoint log 106a, 106b, . . . 106n, respectively, which, for example, may be a circular buffer of the most recent routes/Merkle trees.

Additionally, each core 40a, 40b, . . . , 40n includes an intent log/intent log storage 56a, 56b, . . . , 56n/60a, 60b, . . . , 60n, which is a circular buffer of the most recent transaction groups. Further, each core 40a, 40b, . . . , 40n operates with the respective object allocation space 108a, 108b, . . . , 108n, which includes $B^+$ tree nodes and the object allocation log. All of these resources are pre-allocated for a dedicated core and are used independently one from another in an exclusive non-sharing fashion.

The subject system uses a Copy-on-Write (CoW) operation which clones a current object (or block) by reading the object (or block) from the persistent storage 36 into the Primary memory 46, updates the state of the object so that to note the copy/clone of the object, and subsequently applies changes on the cloned copy.

After updates are finished, the new version of the object/block will be addressed/referenced differently and stored in different NVMe blocks of the memory 36 (i.e., there is no overwriting of the original object on persistent storage).

FIG. 6 shows the node evolution and object migration over multiple iterations of the CoW pipeline. As shown, with regard to Epoch X (the time stamp X), the root node 64 is filled with objects thus creating filled area 110 in the root node 64.

At the epoch X, the internal node 66 (I_O) has the filled buffer 112, while the internal node 66 (I_1) has the filled buffer 114. At the same epoch X, the leaf nodes 68 (L_O, L_1, L_2, and L_3) have respective filled buffers 116, 118, 120, and 122. The content of the filled buffers 110, 112-114, and 116-122 of the time stamp X are buffered in the object cache 70.

In the next iteration corresponding to the epoch Y (time stamp Y), new objects are appended to the existing node object log which for example are appended to the root node 64 creating a filled buffer 124. The filled buffer 124 is copied into the object cache 70.

In the subsequent iteration corresponding to the epoch Z (time stamp Z), the new version of the root node 64 is created and cloned, and the content of the root node 64 at the epoch Y, as well as the content of the object log 114 of the internal node I_1 are emptied into the leaf nodes L_2 and L_3. Thus, the object logs 126 and 128 of the leaf nodes L_2 and L_3 at the epoch Z (time stamp Z) are copied into the object cache 70.

The object migrates down through the $B^+$ tree 62 at the upper tier of nodes fill and flush to the lower node tiers. The changes to the nodes object logs are reflected in the object cache 70 which also flushes all the persisted original objects and changes thereof into the memory sub-system 36, i.e., in respective NVMe devices 37, as shown in FIG. 6.

Figure 7:
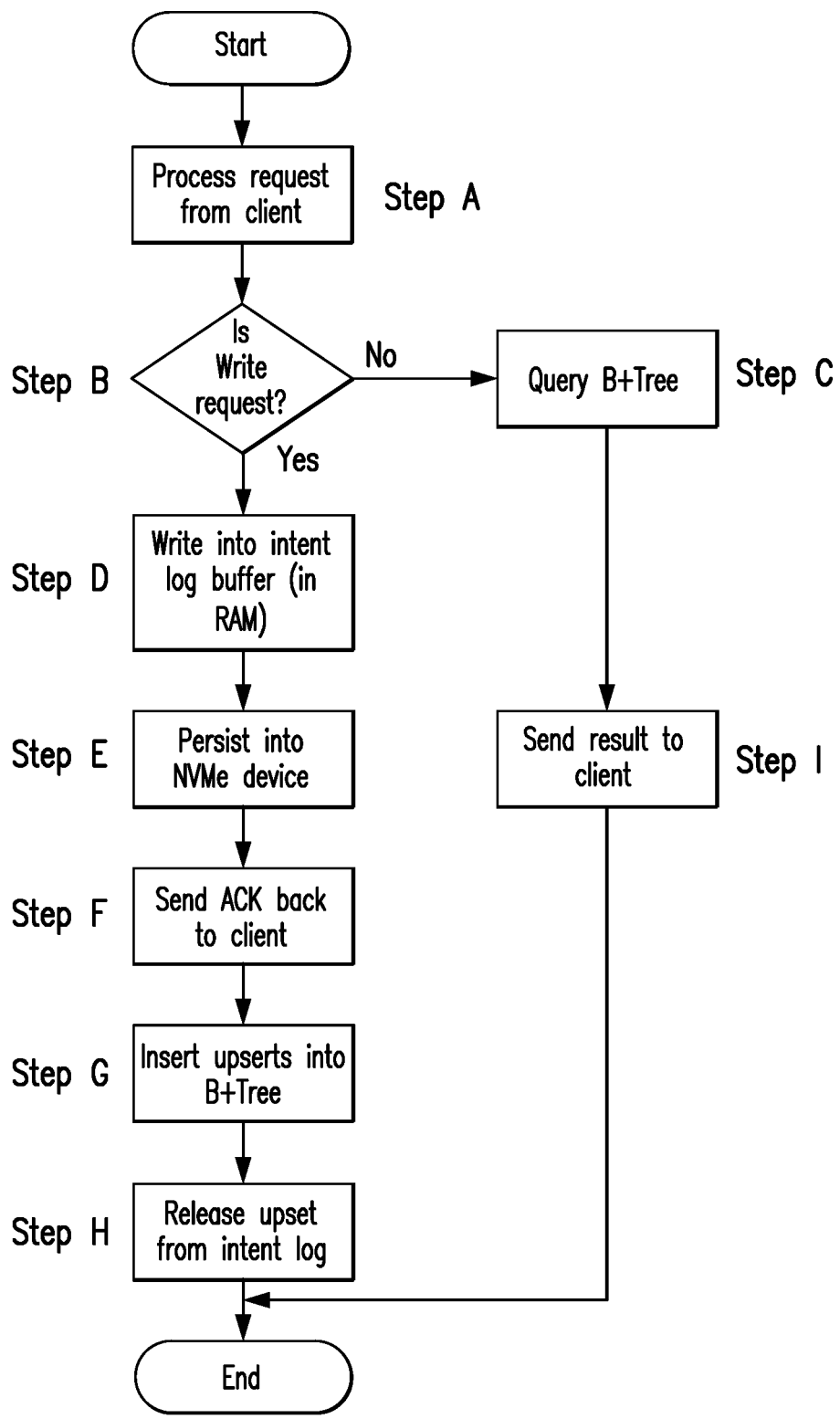
FIG. 7 is a flow chart diagram representative of the process for metadata storage and retrieval used in the present system.

In the process as represented by FIG. 7, the procedure starts in step A where an I/O request is received from a client (data generated entity). When the I/O request is received from the client, the logic flows to the logic block in step B where a decision made if it is a "write" request or a "read" request. If this is a "write" request, the logic follows to step D where the "write" is executed into the Intent Log buffer (in RAM or DRAM). If however in step B, the logic determines that the process request from the client is a "read" request, the logic flows to step C to query $B^+$ tree in accordance with the process shown in FIG. 3.

Upon executing the step D, the logic advances to step E where the metadata is persisted into NVMe device (either in the secondary storage 16 or in the memory sub-system 36).

Subsequently, the system sends acknowledge back to the client to acknowledge that the "write" request has been executed and the metadata is persisted in the storage (NVMe or HDD devices 80 of the secondary storage 16 or NVMe devices 37 of the memory sub-system 36, shown in FIG. 1).

Subsequently, in step G, the content of the Intent Log Buffer is inserted into the $B^+$ tree (as shown in FIG. 2), and the inserts are released from the Intent Log in the subsequent step H.

When the process requested is a "read" request, the B+ tree is searched in step C as shown in FIG. 3 and the results are sent to the client.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for metadata management and access in a data storage system, comprising the steps of:
    (a) establishing a data storage system containing:
        a Central Processor Unit (CPU) sub-system,
        a Metadata Management Unit operatively coupled to said CPU sub-system,
        a memory pool operatively coupled to said CPU sub-system, and
        a storage sub-system configured with a plurality of Non-Volatile Memory (NVM) devices operatively coupled to said Data Storage System, said CPU sub-system and said memory pool;
    (b) configuring said Data Storage System with an Intent Log structure, a $B^+$ tree metadata update structure operatively coupled to said Intent Log structure, and an object aware cache structure operatively coupled to said $B^+$ tree metadata update structure;
    (c) operatively coupling at least one data generating entity to said CPU sub-system and said Data Storage system;
    (d) generating at least one Input/Output (I/O) request by said at least one data generating entity, said at least one I/O request being built with a bulk data portion, a metadata portion containing a plurality of metadata shards, and a processor core identification field, wherein said core processor identification field contains a mapping information assigning each of said plurality of metadata shards in said metadata portion of said I/O request to a respective portion of said CPU sub-system;
    (e) attributing a respective portion of said Data Storage System, said memory pool, and said NVM-based storage sub-system to said respective portion of said CPU sub-system; and (f) processing said each metadata shard for migration between said at least one data generating entity and said respective portion of said NVM-based storage sub-system via said respective portion of said Data Storage System attributed to said respective portion of said CPU sub-system in accordance with commands of said Metadata Management Unit of said Data Storage System through the steps of:
- if said at least one I/O request is a metadata Write request,
- writing said each metadata shard of said at least one I/O request in said Intent Log structure configured in said respective portion of said Data Storage System until a predetermined condition is met,
- persisting said each metadata shard in said respective portion of said NVM-based storage sub-system, and
- inserting said each metadata shard from said Intent Log into said $B^+$ metadata update structure upon said predetermined condition has been met; and
- if said at least one I/O request is a metadata Read Request,
- searching said Intent Log in said respective portion of said Data Storage System for said requested metadata shard,
- if said requested metadata shard is not found in said Intent Log, searching said respective portion of said $B^+$ tree metadata update structure attributed to said respective portion of said CPU sub-system, vertically through said root node, said internal nodes, and said leaf nodes in said assigned portion of said memory pool,
- if said requested metadata shard is not found in said $B^+$ tree metadata update structure, searching a respective portion of said object aware cache attributed to said respective portion of said CPU sub-system for an information on the requested metadata shard residence, and
- reading said requested metadata shard from said NVM-based data storage sub-system attributed to said CPU sub-system into said object cache, and
- sending said requested metadata shard to said requesting at least one data generating entity.

2. The method of claim 1, further comprising the steps of:
in said step (a), partitioning said CPU sub-system into a plurality of processor cores, assigning respective portions of said Data Storage System, said memory pool and said NVM-based storage sub-system, respectively, to each of said plurality of processor cores,
configuring a set of a plurality of operational threads,
operatively coupling each of operational thread from said set of plurality thereof to a respective one of said plurality of processor cores, and
in said step (f), operatively coupling said each metadata shard to said operational thread pinned to said respective processor core identified in said processor core identification field of said I/O request.

3. The method of claim 2, further comprising the steps of:
in said step (b) coupling an Intent Log storage device to said Intent Log structure for collecting said plurality of metadata shards in said Intent Log until a predetermined condition has been met, and
in said step (f), releasing said collection of said plurality of said each metadata shards to said $B^+$ tree metadata update structure.

4. The method of claim 3, wherein said predetermined condition includes either a fullness of said intent log storage device, a predetermined time period, or an eager flushing.

5. The method of claim 1, further comprising the steps of:
in said step (f), dynamically configuring said $B^+$ tree metadata update structure with a root node on a first tier branching in at least two internal nodes forming a second tier, wherein each internal node branches into at least two leaf nodes forming a third tier, and
inserting said collection of said plurality of said each metadata shards into said $B^+$ tree metadata update structure beginning with said root node followed by said internal nodes and subsequently followed by insertion in said leaf nodes.

6. The method of claim 2, wherein said each metadata shard includes a new metadata shard or an update on an original metadata shard persisted in said respective portion of said NVM-based storage sub-system, further comprising the steps of:
in said step (f), applying a Copy-on-Write (CoW) routine to said each metadata shard on each update thereof through the steps of:
reading said each original metadata shard from said respective portion of said NVM-based storage sub-system into said respective portion of said memory pool,
updating the state of said each original metadata shard to identify it as a clone metadata shard,
apply said each update to said clone metadata shard,
establishing a reference for said updated clone metadata shard that is different than a reference for said each original metadata shard, and
storing said updated clone metadata shard at a second address in said respective portion of said NVM-based storage sub-system attributed to said respective processor core in a non-interfering fashion with a first address of said each original metadata shard in said respective portion of said NVM-based storage sub-system.

7. The method of claim 6, further comprising:
in said step (f), applying multiple iterations, including a first epoch iteration, a second epoch iteration, and a third epoch iteration to said $B^+$ tree metadata update structure through the steps of:
in said second epoch iteration, subsequent to said first epoch iteration, appending metadata shards to an Object Log of said root node existing in said first epoch iteration, thus filling said Object Log of said root node, and
in said third epoch iteration, subsequent to said second epoch iteration, cloning said root node existing in said second epoch iteration, and emptying said cloned root node of said second epoch iteration into lower tiers of said $B^+$ tree metadata update structure containing said internal nodes and said leaf nodes.

* * * * *